United States Patent [19]

Miller, Jr.

[11] 4,149,688
[45] Apr. 17, 1979

[54] LIFTING BODY AIRCRAFT FOR V/STOL SERVICE

[75] Inventor: William McE. Miller, Jr., Princeton, N.J.

[73] Assignee: Aereon Corporation, Princeton, N.J.

[21] Appl. No.: 728,608

[22] Filed: Oct. 1, 1976

[51] Int. Cl.² .......................................... B64C 21/00
[52] U.S. Cl. ................................ 244/12.4; 244/25; 244/36; 244/56
[58] Field of Search .............. 244/12.1, 12.4, 42 CC, 244/36, 55, 56, 66, 65, 13, 15, 87, 25, 7 R

[56] References Cited

U.S. PATENT DOCUMENTS

| D. 188,226 | 6/1960 | Jones et al. | D12/76 |
|---|---|---|---|
| 1,855,652 | 4/1932 | Sanders | 244/55 |
| 2,380,535 | 7/1945 | McDevitt | 244/36 |
| 2,964,264 | 12/1960 | Multhopp | 244/12.4 |
| 3,029,042 | 4/1962 | Martin | 244/36 |
| 3,115,317 | 12/1963 | Merrick | 244/66 X |
| 3,179,354 | 4/1965 | Alvarez-Calderon | 244/42 CC |
| 3,181,810 | 5/1965 | Olson | 244/66 |
| 3,761,041 | 9/1973 | Putman | 244/36 |
| 3,829,044 | 8/1974 | Leslie et al. | 244/42 CC |

FOREIGN PATENT DOCUMENTS

| 1939338 | 2/1970 | Fed. Rep. of Germany | 244/55 |
|---|---|---|---|
| 491147 | 5/1919 | France | 244/55 |
| 779508 | 4/1935 | France | 244/66 |

OTHER PUBLICATIONS

McE. Miller et al., "The Lifting Body Airship", Canadian Aero and Space Journal, pp. 23–29, Jan. 1976.
Dornier, U.S. Published Serial No. 265,721, 7-1943.

*Primary Examiner*—Galen L. Barefoot
*Attorney, Agent, or Firm*—George A. Smith, Jr.

[57] ABSTRACT

An unexpectedly high augmentation of aerodynamic lift for a given amount of power in STOL operation of a V/STOL aircraft is achieved by combining the unique features of a lifting body with those of a "jet flap", i.e. an aerodynamic mechanism in which a slipstream is directed over a deflected flap. Specifically, a movable flap is located on the trailing edge of the lifting body, and a tiltable propeller, which propels the aircraft in the normal manner in cruising, may be tilted, in low-speed flight, in order to direct air toward the leading edge of the flap and over the upper surface thereof. The movement of a large mass of air at a higher velocity over the upper surface of the flap maintains the air flow over the flap in an attached condition, and entrains and energizes the lower-velocity boundary layer on the airfoil forward of the flap, thereby producing an augmentation in lift. The lifting body lends itself especially to lift augmentation in that, for a given lifting surface area, the low aspect ratio of the lifting body gives rise to a much greater lift augmentation than would be afforded by a high aspect ratio surface.

8 Claims, 3 Drawing Figures

U.S. Patent
Apr. 17, 1979
4,149,688
FIG. 1.
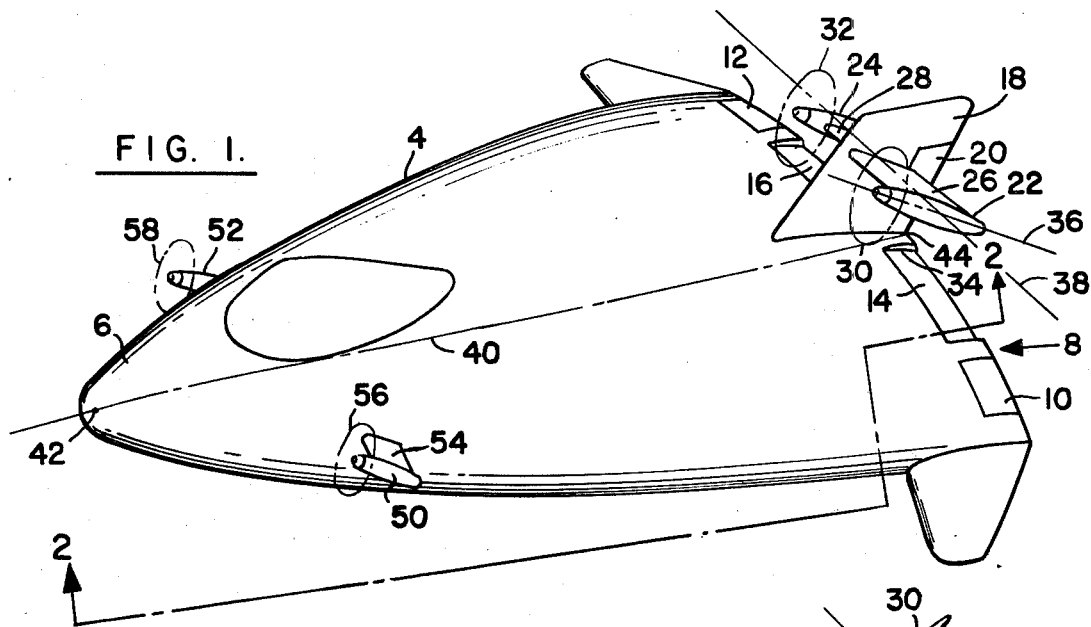
FIG. 2.
FIG. 3.
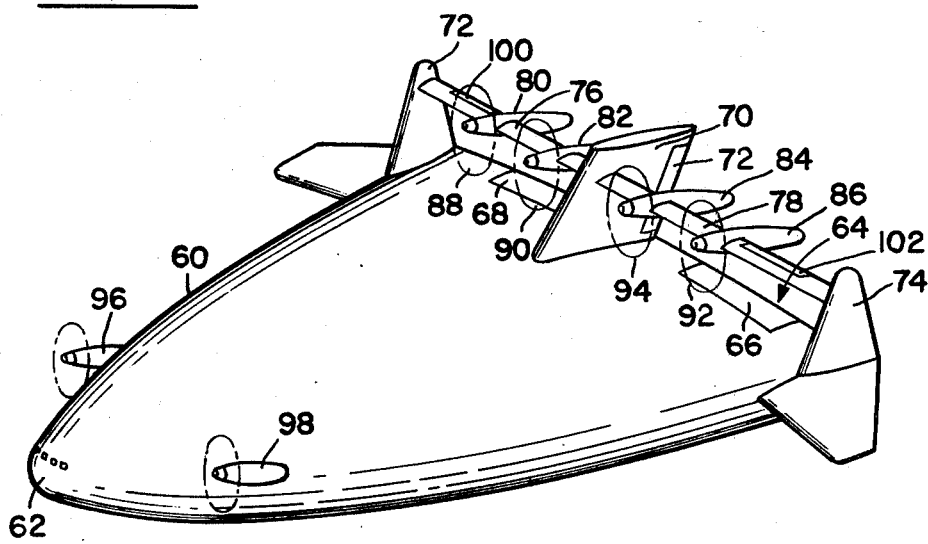

LIFTING BODY AIRCRAFT FOR V/STOL SERVICE

SUMMARY OF THE INVENTION

This invention relates to lifting body aircraft, and particularly to a lifting body aircraft designed for V/STOL (vertical, or short take-off and landing) service.

A lifting body aircraft, as the term is used herein, refers to aircraft having a substantially continuous airfoil surface from one end of its span to the other, and lacking a well-defined transition between wing and fuselage. A typical lifting body is described in U.S. Pat. No. RE. 28,454, dated June 17, 1975 to John R. Fitzpatrick and Juergen K. Bock. The lifting body described in the patent is characterized by a substantially triangular or delta-shaped planform, a nose at one corner of the triangle, and a trailing edge opposite the nose and extending between a pair of lateral extremities, each at one of the remaining corners of the triangle. The sides of the triangle which meet at the nose form portions of the leading edge, and vertical longitudinal sections of the lifting body are thick airfoil sections which may be either cambered or uncambered. The lifting body preferably comprises an enclosed hull substantially symmetrical about a central vertical plane extending from its nose to a mid-point at the wide end opposite the nose. The transverse cross-sections throughout substantially all of the length of the lifting body are substantially elliptical on either side of the central vertical plane. From the nose to the point of maximum vertical dimension in the central vertical plane, the elliptical cross-sections become progressively higher and progressively wider, with width increasing more rapidly than height. From the point of maximum vertical dimension toward the trailing edge, however, the elliptical cross-sections continue to increase progressively in width, but decrease progressively in height. Various deviations from the above-described relationships may exist in a lifting body, for example, with respect to the configuration of the nose and lateral extremities.

Such lifting bodies are designed for longitudinal static stability, possess favorable stall characteristics, and are capable of relatively high cruising speeds and relatively low landing speeds. They can be made to carry a large payload efficiently, and may be operated heavier-than-air, or, with helium, either lighter-than-air or slightly heavier-than-air.

Lifting body aircraft of the type just described have particular utility in such fields as surveillance by the police and military, aerial photography, geophysical exploration and other research activities, the transportation of equipment and supplies to and from remote areas, the efficient transportation of high-volume low-density cargo, and the transportation and handling of large externally carried loads such as pipeline sections. In many of these applications, a STOL capability is desirable.

In accordance with this invention, an unexpectedly high augmentation of lift for a given amount of power in a STOL aircraft is achieved by combining the unique features of a lifting body with those of a "jet flap", i.e. an aerodynamic mechanism in which a slipstream is directed over a deflected flap. Specifically, a movable flap is located on the trailing edge of the lifting body, and a tiltable propeller, which propels the aircraft in the normal manner in cruising, may be tilted, in low-speed flight, in order to direct air toward the leading edge of the flap and over the upper surface thereof. The movement of a large mass of air at a velocity higher than free-stream velocity over the upper surface of the flap maintains the air flow over the flap in an attached condition, and entrains and energizes the low-velocity boundary layer on the airfoil forward of the flap, thereby producing an augmentation in lift. The lifting body lends itself especially to lift augmentation in that the low aspect ratio of the lifting body gives rise to a much greater lift augmentation than would be afforded by a high aspect ratio surface of a given lifting surface area.

The principal object of the invention, therefore, is to provide an improved STOL aircraft in which the augmentation of lift is exceptionally high for a given amount of power provided. The increased augmentation of lift achieved by the use of the invention gives rise to a number of attendant advantages, among which are: the capability of operation both at high and at extremely low forward speeds, and efficient operation over a wide range of forward speeds.

BRIEF DESCRIPTION OF THE DRAWINGS

FIG. 1 is a perspective view of a small-scale lifting body aircraft in accordance with the invention;

FIG. 2 is a side elevation, partly in section, of the aircraft of FIG. 1; and

FIG. 3 is a perspective view of a large-scale aircraft in accordance with the invention.

DETAILED DESCRIPTION

FIG. 1 shows a lifting body aircraft comprising a hull 4 having a substantially delta-shaped planform, a nose 6, and a wide trailing edge 8 opposite the nose.

Trailing edge 8 is constituted in part by various control surfaces, including outboard elevons 10 and 12, as well as inboard flaps 14 and 16, these control surfaces being arranged symmetrically on either side of a centrally located vertical stabilizer 18. The vertical stabilizer includes a rudder 20.

The aircraft is powered by four gas turbine engines. Two of the engines, 22 and 24, are supported from vertical stabilizer 18 on opposite sides thereof respectively by horizontally extending supports 26 and 28. Engines 22 and 24 are positioned so that the backwash of their respective propellers 30 and 32 flows at least in part over their corresponding flaps 14 and 16. Preferably, each engine is arranged so that substantially all of the backwash from its propeller flows over the corresponding flap. Thus, for example, engine 22 is so arranged with respect to flap 14, that the innermost edge 34 of flap 14 is spaced from an imaginary vertical plane in which the central chord of the aircarft lies by a distance which is less than the separation between said plane and the innermost extent of the disc of propeller 30. Engine 34 is similarly related to the innermost edge of flap 16. The reason for this relationship, as will appear below, is that, under certain conditions, it is desired to have the backwash of the propellers come into contact with and interact with the flaps.

In cruising, the backwash of propellers 30 and 32 is directed generally horizontally. However, the engines are tiltable through a range of positions, including the position illustrated in FIG. 1. The engines are tilted by supports 26 and 28, which are in turn operated by a suitable drive mechanism contained within the vertical stabilizer 18. Engine 22, for example, has a propeller axis 36, which is tiltable about a second axis 38 which extends transversely to the central chord of the aircraft and substantially parallel to a straight line between the ends of the trailing edge. The central chord is shown as an imaginary chordwise line 40 extending from the center 42 of the nose to the center 44 of trailing edge 8.

Referring now to FIG. 2, axis 38 is shown as a point, since it is viewed endwise in FIG. 2. Propeller axis 36 is positionable by the engine support, both in a first position illustrated by line 46, which intersects the aircraft's center of gravity C.G., and in a second position which is the position shown. The axis of propeller 32 is similarly tiltable, and the engines are preferably interlocked with each other to insure simultaneous tilting.

The tilting of the engines allows the aircraft to develop lift efficiently at very low speeds by preventing air flow separation from the flaps when they are deflected downwardly. With flap 14 in the position shown in FIG. 2, and the propeller axis 36 aligned in parallel relationship with line 46, flow separation would tend to take place at the upper surface of flap 14. This flow separation becomes more severe with greater deflection of the flap. On the other hand, with the engine tilted to the position shown, the propeller backwash is directed toward the leading edge 48 of the flap and over the upper surface thereof. The direction of the propeller backwash is more nearly parallel to the chord of the flap, and causes the flow over the upper surface of the flap to remain in an attached condition, greatly improving the overall lift of the aircraft. The aerodynamic mechanism by which a propeller slipstream directed over a deflected flap produces an increase in the lifting force acting on the wing is explained in detail in McCormick, *Aerodynamics of V/STOL Flight*, Academic Press, New York and London, 1967 pp. 194–200.

The principal advantage of this invention resides in the combination of the unique features of a "jet flap" with those of a lifting body. In particular, the jet flap, measured by the width of the flap which is influenced by the propeller backwash, is rather narrow by reason of limitations on propeller size. At the same time, the lifting body has a very low aspect ratio, i.e. less than about 2.0, and preferably less than about 1.5. In consequence of its low aspect ratio, the lifting body presents a large portion of its effective lifting surface area to the influence of the narrow jet flap. As a result, this combination of features results in a uniquely high range of variation of lift for a constant power, and hence a much greater flexibility than heretofore achieved in STOL aircraft. For example, it can be shown that the change in lift that can be achieved by the use of the invention in a lifting body having a propeller diameter to body length ratio of 1/10 and a flap chord to body length ratio also of 1/10 can be as much as 40%.

With the engine in the position shown in FIG. 2, some lift is also attributable to a vertical component of the propeller thrust, which is an additional advantage of the arrangement described.

Desirably, the propeller axis is tiltable to a vertical condition, and the flap is pivoted at a location so that, the flap can be deflected almost vertically or vertically to provide a clearance for downward flow of a large portion of the propeller backwash. With this arrangement, all of the lift produced by the rearwardly located propellers is attributable to thrust, and vertical take-off and hovering can be achieved.

FIG. 1 also shows two tiltable forward engines 50 and 52. Engine 50 is mounted on and positionable by a horizontally extending support 54, which is rotatable about an axis transverse to line 40. Engine 52 is similarly mounted on the opposite side of hull 4. Propellers 56 and 58 on engines 50 and 52 are located forward of the center of gravity of the aircraft. The axes of these additional propellers are positionable by the rotatable supporting arms both in a first position generally parallel to line 40, and in a second position, as best shown in FIG. 2, wherein the backwash of the propeller is directed downwardly and rearwardly.

The forward engines are preferably positionable through a continuous range of positions from horizontal to vertical in order to produce lift through the vertical component of propeller reaction. Thus, the tiltable nature of the forward propellers allows for a high degree of flexibility in slow-speed flight, and also provides for short take-off and landing distances. Vertical take-off can be achieved by positioning the axes of all four engines vertically. One additional advantage of the forward engines is that their weight balances the moment caused by the weight of the rearwardly located engines. It is also possible to make the forward engines rearwardly tiltable to impart a rearward thrust to the aircraft, to give the aircraft greater maneuverability in hovering.

The symmetrical arrangement of the fore and aft engines with respect to each major axis provides for a four-post control about the major axes, in both hover and cruise. Locating the rear engines above and athwart the centerline axis, but inboard of the lateral extremities of the hull, permits efficient cross-shafting, and also permits the engine support-structure to act as an empennage.

FIG. 3 shows a larger lifting body aircraft comprising a hull 60 having a substantially delta-shaped planform, a nose 62, and a wide trailing edge 64 opposite the nose. Trailing edge 64 is constituted in part by flaps 66 and 68, the flaps being arranged symmetrically on either side of a centrally located vertical stabilizer 70, which includes a rudder 72.

Additional vertical stabilizers 72 and 74 are shown at opposite ends of trailing edge 64. A first engine support 76 extends between and is supported by vertical stabilizers 70 and 72, and a second similar engine support 78 extends between vertical stabilizers 70 and 74. Engine supports 76 and 78 are preferably airfoils shaped to have a streamline profile. A pair of engines 80 and 82 are supported on support 76 in side-by-side relation to each other. A similar pair of engines 84 and 86 are mounted in side-by-side relation on support 78. Supports 76 and 78 are rotatable in the same manner as supports 26 and 28 (FIG. 1), a suitable motor-operated drive assembly being provided within vertical stabilizer 70, and suitable bearings being provided in vertical stabilizers 72 and 74.

Engines 80 and 82 are located with respect to flap 68 in such a way that, when engines 80 and 82 are tilted by support 76, the backwash from their propellers 88 and 90 is directed toward the leading edge of flap 68. Preferably, the propellers and flap are so arranged that the outermost extent of the disc of propeller 88 is spaced from an imaginary vertical plane in which the central chord of the aircraft lies by a distance which is less than the separation between said plane and the outermost extent of flap 68. Similarly, the innermost edge of flap 68 is preferably spaced from said vertical plane by a distance which is less than the separation between said plane and the innermost extent of the disc of propeller 90. Propellers 92 and 94 are similarly located with respect to flap 66.

The aircraft of FIG. 3 is also provided with tiltable forward engines 96 and 98, which are similar to engines 50 and 52 in FIG. 1. The operation of the aircraft of FIG. 3 is similar to that of FIG. 1, the rearwardly located engines being tiltable from a first position generally parallel to an imaginary chordwise line to a second position such that the backwash of the propellers is directed toward the leading edges of flaps 66 and 68 in order to prevent flow separation from the flaps when the flaps are deflected downwardly. Desirably, the rear engines are tiltable to an extent such that the backwash is directed downwardly for purposes of vertical take-off and hovering.

In the aircraft of FIG. 3, roll and pitch control is effected, at least in part, by control surfaces 100 and 102 which are built into supports 76 and 78 respectively. Control surface 100 is located at least in part behind the disc of propeller 88, and control surface 102 is located at least in part behind the disc of propeller 92. With the control surfaces so located, control effectiveness is greatly increased by the high velocity of the air flowing over at least part of the respective control surfaces as a result of the operation of the propellers. The positioning of the control surfaces 100 and 102 as described provides for effective roll and pitch control of the large aircraft, even at very low speeds. Likewise, both in FIGS. 1 and 3, the locating of the propeller wash on either side of the vertical fin and rudder will increase yaw control effectiveness at very low speeds.

I claim:

1. An aircraft comprising in combination a lifting body and a jet flap at the trailing edge thereof, said aircraft having a substantially delta-shaped planform, a nose, and a wide trailing edge opposite said nose, movable flap means forming part of said trailing edge, propeller means for producing a propulsive thrust solely as a result of the reaction of a plurality of rotating blades with the surrounding atmosphere, said blades being mounted on a hub rotatable on a first axis, and means for tilting said first axis about a second axis located above, and extending transversely to, an imaginary chordwise line extending from the center of said nose to the center of said trailing edge, said first axis being positionable, by said tilting means, both in a cruising position wherein said hub is located directly above said delta-shaped planform and the direction of thrust exerted by said propeller means approximately intersects the center of gravity of the aircraft, and in a second position, said second position being such that, with the direction of thrust in relation to the blades being the same as in the cruising position, the backwash of said propeller means is directed toward the leading edge of said flap means, and over the upper surface thereof.

2. An aircraft according to claim 1 in which the aspect ratio of said lifting body is less than about 2.0.

3. An aircraft according to claim 1 in which the aspect ratio of said lifting body is less than about 1.5.

4. An aircraft according to claim 1 having additional propeller means rotatable about an axis and located forward of the center of gravity of the aircraft, and means for tilting said axis of said additional propeller means, said axis of said additional propeller means being positionable by said tilting means both in a first position generally parallel to said chordwise line, and in a second position, said second position being such that the backwash of the propeller is directed downwardly and rearwardly.

5. A lifting body aircraft according to claim 4 in which each of said propellers is positionable to a position in which its backwash is directed downwardly.

6. An aircraft comprising in combination a lifting body and a jet flap at the trailing edge thereof, said aircraft having a substantially delta-shaped planform, a nose, and a wide trailing edge opposite said nose, movable flap means forming part of said trailing edge, propeller means rotatable on a first axis, and means for tilting said first axis about a second axis extending transversely to an imaginary chordwise line extending from the center of said nose to the center of said trailing edge, said first axis being positionable, by said tilting means, both in a cruising position wherein the direction of thrust exerted by said propeller means approximately intersects the center of gravity of the aircraft, and in a second position, said second position being such that the backwash of said propeller means is directed toward the leading edge of said flap means, and over the upper surface thereof, and having a centrally located, upwardly extending vertical stabilizer, and in which such propeller means comprises at least two engines each having a propeller drivable thereby, and said tilting means comprises means supporting said engines from said stabilizer on opposite sides thereof.

7. An aircraft according to claim 6 having two additional upwardly extending vertical stabilizers on opposite sides of said centrally located stabilizer and in which said tilting means comprises means laterally extending between said centrally located stabilizer and said additional stabilizers and supported thereby, for supporting said engines from said stabilizers on opposite sides of said centrally located stabilizer.

8. An aircraft according to claim 7 in which said means laterally extending between said centrally located stabilizer and said additional means are airfoil means having movable control surface means thereon located at least in part in the path of the backwash of said propellers.

* * * * *